US006882659B1

(12) United States Patent
Novak et al.

(10) Patent No.: US 6,882,659 B1
(45) Date of Patent: Apr. 19, 2005

(54) WIDE AREA NETWORK SYNCHRONIZATION

(75) Inventors: Lars Novak, Bjärred (SE); Björn Ekberg, Skanör (SE); Andreas Jönsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/568,340

(22) Filed: May 10, 2000

Related U.S. Application Data

(60) Provisional application No. 60/154,782, filed on Sep. 20, 1999.

(51) Int. Cl.[7] ................................................. H04J 3/22
(52) U.S. Cl. ..................................... 370/466; 370/353
(58) Field of Search ............................... 370/352, 353, 370/466, 465, 201, 252, 338, 313, 401; 707/201

(56) References Cited

U.S. PATENT DOCUMENTS

| | | | |
|---|---|---|---|
| 5,539,744 A | * 7/1996 | Chu et al. ................... | 370/397 |
| 5,564,070 A | * 10/1996 | Want et al. .................. | 455/507 |
| 5,570,084 A | 10/1996 | Ritter et al. | |
| 5,608,719 A | 3/1997 | Hyodo et al. | |
| 5,623,605 A | * 4/1997 | Keshav et al. ............... | 709/236 |
| 5,666,530 A | * 9/1997 | Clark et al. .................. | 707/201 |
| 5,717,737 A | * 2/1998 | Doviak et al. ............... | 455/403 |
| 5,848,064 A | 12/1998 | Cowan | |
| 5,854,789 A | 12/1998 | Lesch et al. | |
| 5,862,326 A | 1/1999 | Bapat | |
| 5,896,369 A | 4/1999 | Warsta et al. | |
| 5,903,618 A | 5/1999 | Miyake et al. | |
| 5,907,801 A | 5/1999 | Albert et al. | |
| 5,913,032 A | 6/1999 | Schwartz et al. | |
| 5,956,331 A | 9/1999 | Rautiola et al. | |
| 6,034,621 A | * 3/2000 | Kaufman .................... | 340/7.21 |
| 6,041,045 A | * 3/2000 | Alterman et al. ............ | 370/313 |

(Continued)

FOREIGN PATENT DOCUMENTS

| | | | | |
|---|---|---|---|---|
| WO | WO 9702688 A1 | * 1/1997 | ............ | H04L/12/56 |
| WO | WO 9857507 A2 | * 12/1998 | ............ | H04Q/7/22 |
| WO | 99/16266 | 4/1999 | | |

OTHER PUBLICATIONS

Fasbender, A. et al. "Any Network, Any Terminal, Anywhere [cellular radio]". Personal Communications, IEEE. Apr. 1999. vol. 6 iss. 2. pp. 22–30.*

Ruggaber, R. et al. "Using WAP as the Enabling Technology for CORBA in Mobile and Wireless Environments". 7th IEEE Workshop on Future Trends of Distributed Computing Systems, Dec. 1999. pp. 69–74.*

"Agenda X Microsoft Exchange Corporate Calendar, Administrator Guide Version 3.1, Revision O, pp. 2–55."

*Primary Examiner*—John Pezzlo
*Assistant Examiner*—Donald L Mills
(74) *Attorney, Agent, or Firm*—Potomac Patent Group, PLLC

(57) ABSTRACT

A mobile application running in a mobile device may be coordinated or synchronized with a non-mobile application running in a non-mobile device. The mobile and non-mobile applications may be, for example, calendar applications. To permit the use of a session-oriented (connection-oriented) protocol stack when the transmission medium between the mobile and non-mobile devices is connectionless, the mobile device sends an initial communication to the non-mobile device. In response to receipt of the initial communication, a session identifier is generated. A first connection-oriented protocol frame is then formed that includes an initial response and the session identifier. The first connection-oriented protocol frame is embedded in a first connectionless protocol frame, and the first connectionless protocol frame is sent to the mobile device. Although the mobile device initiates the session, the session is controlled by the non-mobile device.

5 Claims, 6 Drawing Sheets

U.S. PATENT DOCUMENTS

| | | | | |
|---|---|---|---|---|
| 6,125,369 A | * | 9/2000 | Wu et al. | 707/201 |
| 6,128,661 A | * | 10/2000 | Flanagin et al. | 709/227 |
| 6,549,776 B1 | * | 4/2003 | Joong | 455/433 |
| 6,628,617 B1 | * | 9/2003 | Karol et al. | 370/237 |
| 6,661,784 B1 | * | 12/2003 | Nykanen | 370/338 |
| 2001/0032254 A1 | * | 10/2001 | Hawkins | 709/219 |

* cited by examiner

WIDE AREA NETWORK SYNCHRONIZATION

This application claims priority under 35 U.S.C. §§119 and/or 365 to Provisional Application Ser. No. 60/154,782 filed in United States on Sep. 20, 1999; the entire content of which is hereby incorporated by reference.

BACKGROUND

The present invention relates to the synchronization of devices, and more particularly to the synchronization of data stored in devices over a network.

In recent years, users of mobile devices have often faced the problem of having the same data stored in the mobile devices as in their stationary computers, such as a server or desktop computer. These mobile devices, such as personal digital assistants (PDA), mobile telephones and portable computers, store a variety of information including calendar entries, contact entries, task lists, and the like. To avoid having to enter information on both the mobile device and on the server, it is desirable to allow the data stored on these devices to be synchronized with each other. Synchronization of data between mobile devices also avoids scheduling conflicting appointments. Further, by synchronizing the data stored in a mobile device the user can be confident that if the data is accidentally erased from the mobile device, the data can be recovered from the server.

One conventional method of synchronizing data between devices is through the use of the protocol standards published by the InfraRed Data Association (IrDA). These protocol standards provide methods for sending data between devices using infrared communications. One of the protocol standards published by the IrDA is OBEX. OBEX stands for "object exchange" and describes a way to send an arbitrary data object from one unit to another in a simple way. The OBEX protocol consists of two major parts, the session level protocol and the application framework. The session level protocol dictates what can be said during the conversation between the units which are exchanging data and a set of operational codes (opcodes) that define specific actions. The application framework, which is built on top of the session protocol, provides a model for representing the objects to be sent. The application framework is necessary to ensure interoperability between units using OBEX. For more information regarding OBEX, the interested reader should refer to "IrDA Object Exchange Protocol IrOBEX", Counterpoint Systems Foundry, Inc., Version 1.2, Mar. 18, 1999, which is expressly incorporated herein by reference.

Another protocol standard published by the IrDA is known as Infrared Mobile Communication (IrMC). IrMC provides a model for how to store and access data, such as calendar items, contacts, and the like. Using the IrMC model, when changes are made to a calendar item in the mobile device, the changes will be made to the calendar item in the server when the mobile device and stationary computer are subsequently synchronized. Typically, IrMC is placed in the application layer on top of the OBEX layer in an IR protocol stack. For more information regarding IrMC the interested reader should refer to "Specifications For Ir Mobile Communications (IrMC)", Version 1.1 Mar. 1, 1999, which is expressly incorporated herein by reference.

Although a combination of IrMC and OBEX provides an efficient model for synchronizing data, the medium over which these protocols are designed to communicate has many deficiencies. For example, since these protocols are designed to operate using infrared communications, devices which are to exchange data must have a line of sight connection between them in order to ensure that the devices can communicate. Further, these protocols are connection oriented, and hence, these protocols are not designed to operate in a connectionless environment such as the Internet.

As Internet communications continue to proliferate it is desirable to provide protocols compatible with the Internet Protocol (IP) which would allow users of various devices to access information and services stored on the Internet. One model for providing access to information and services stored on the Internet to mobile devices, such as wireless phones, is known as Wireless Applications Protocol (WAP). WAP is an open global specification which is designed to enable easy fast delivery of relevant information and services to mobile users.

FIG. 1 illustrates an exemplary network configuration for a mobile device to communicate over the Internet using WAP. Mobile device 110 communicates over air interface 120 with antenna 130. The signals received by antenna 130 are communicated to a WAP to IP Gateway 140. WAP to IP Gateway 140 is primarily responsible for converting the signals between WAP and IP protocols. After converting the signals received from antenna 130, the WAP to IP Gateway 140 forwards the signals over network 150 to server 160. Server 160 receives the signals and sends a response, if requested, back to the mobile device 110 over network 150 to WAP to IP Gateway 140. WAP to IP Gateway 140 converts the signals received from server 160 from IP to WAP and forwards the signals to antenna 130. Antenna 130 then sends the WAP signals over air interface 120 to mobile device 110. The network of FIG. 1 has been simplified for ease of understanding. One skilled in the art will recognize that the network of FIG. 1 could include base stations, mobile switching centers, and the like.

Since WAP is designed as a connectionless protocol, WAP, like IP is also stateless. Accordingly, the state of the application must be maintained by the application itself.

FIG. 2 illustrates conventional signaling between a server and client in connectionless protocols such as WAP and IP. Typically, the client 210 will initiate a session with server 220 by sending an Initiate Session message 230 to the server 220. The server 220 will respond with a Session Initiated message 235 containing the session ID for the connection between the client 210 and server 220. Now that the session has been initiated, the client 210 sends a Request for Information message 240, including the session ID, to the server 220. In response, the server 220 sends an Information Response message 245, including the session ID to the client 210. As illustrated by the broken lines, the client 210 may send more Information Request messages and the server 220 continues to reply with Information Response messages. When the client 210 desires to terminate the session with the server 220, the client 210 sends an End Session message 250. In response the server 220 sends a Session Ended message 255. Each of the messages exchanged between the client 210 and the server 220 contains the session ID so that both the client 210 and the server 220 can associate the received messages with the particular session established between the client 210 and server 220. In typical Internet communications, the client is a browser and the session ID is sent in hidden fields of forms passed between the browser and the server.

As illustrated in FIG. 2, connectionless protocols such as WAP have defined Request/Response pairs such that the client who has initiated the session will also control the session. In other words, connectionless protocols define that the party who initiates the session will be the party who sends the information requests and the other party will only send messages in response to information requests. When synchronizing data between a mobile device and a server, it is preferable to place the synchronization logic on the server side because the mobile device typically has limited resources in terms of memory and processing capacity. Accordingly, the synchronization process should be controlled by the server which typically has sufficient memory and processing capacity for performing the synchronization. In typical synchronization applications the mobile device initiates the synchronization process. However, as described above, connectionless protocols would require that the mobile device, and not the server, control the session.

Accordingly, it would be desirable to provide a synchronization protocol such as IrMC which avoids one or more of the deficiencies of the infrared air interface. It would also be desirable to provide a synchronization protocol that operates in a connectionless environment such as the Internet. It would further be desirable to provide a synchronization protocol where the synchronization session is initiated by the mobile device but is controlled by the server.

SUMMARY

The foregoing and other objects are achieved in synchronization methods and apparatuses for use in a connectionless protocol. In accordance with one aspect of the invention, an initial communication is sent from the mobile device to the non-mobile device. In response to receipt of the initial communication, a session identifier is generated. A first connection-oriented protocol frame that includes an initial response and the session identifier is generated. The first connection-oriented protocol frame is embedded in a first connectionless protocol frame. The first connectionless protocol frame is sent to the mobile device.

In yet another aspect of the invention, the request for service is a command for modifying the mobile application based on the non-mobile application.

In still another aspect of the invention, the mobile application and the non-mobile application are each calendar applications.

In yet another aspect of the invention, the command for modifying the mobile application based on the non-mobile application synchronizes an aspect of the mobile application and the non-mobile application.

In still another aspect of the invention, the first connection-oriented protocol frame is an OBEX frame.

In yet another aspect of the invention, the first connectionless protocol frame is a WSP frame.

In another aspect of the invention, the mobile device forms a second connection-oriented protocol frame that includes an invitation to provide service and the session identifier. The second connection-oriented frame is embedded in a second connectionless protocol frame. The second connectionless protocol frame is sent to the non-mobile device. The invitation to provide service and the session identifier is received in the non-mobile device and in response thereto a third connection-oriented protocol frame is formed that includes a request for service and the session identifier. The third connection-oriented protocol frame is embedded in a third connectionless protocol frame. The third connectionless protocol frame is sent to the mobile device. In yet another aspect of the invention, the non-mobile device controls the coordination of the mobile application with the non-mobile application.

BRIEF DESCRIPTION OF THE DRAWINGS

The objects and advantages of the invention will be understood by reading the following detailed description in conjunction with the drawings in which.

DETAILED DESCRIPTION

Figure 1:
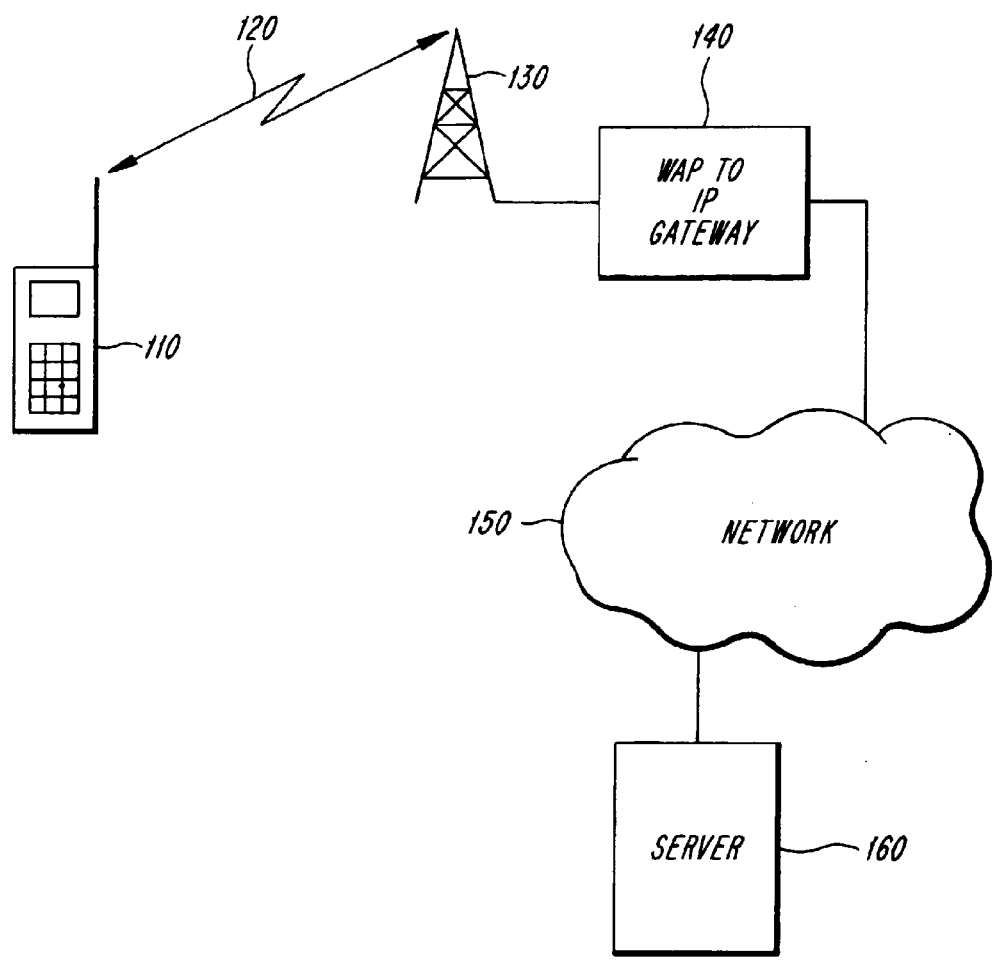
FIG. 1 depicts a conventional wireless network for use with a wireless connectionless protocol such as WAP.
Figure 2:
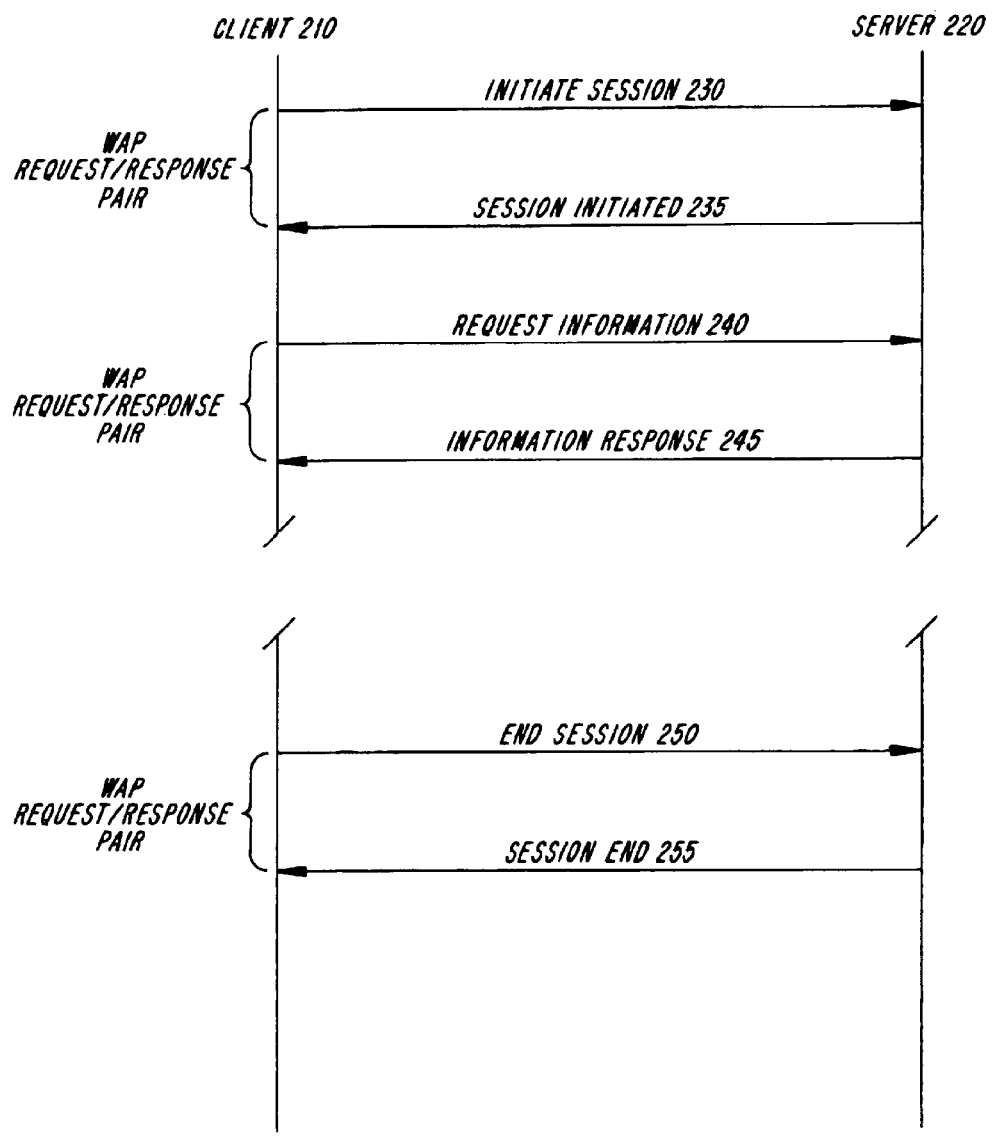
FIG. 2 depicts conventional request and response signaling between a client and server which communicate using a connectionless protocol.

The various features of the invention will now be described with respect to the figures, in which like parts are identified with the same reference characters. Although the following description is provided in the context of synchronization of data between mobile devices and servers, those skilled in the art will appreciate that the present invention is equally applicable to synchronization of data between non-mobile wireless devices and any type of storage system connected to a network as well.

Figure 3:
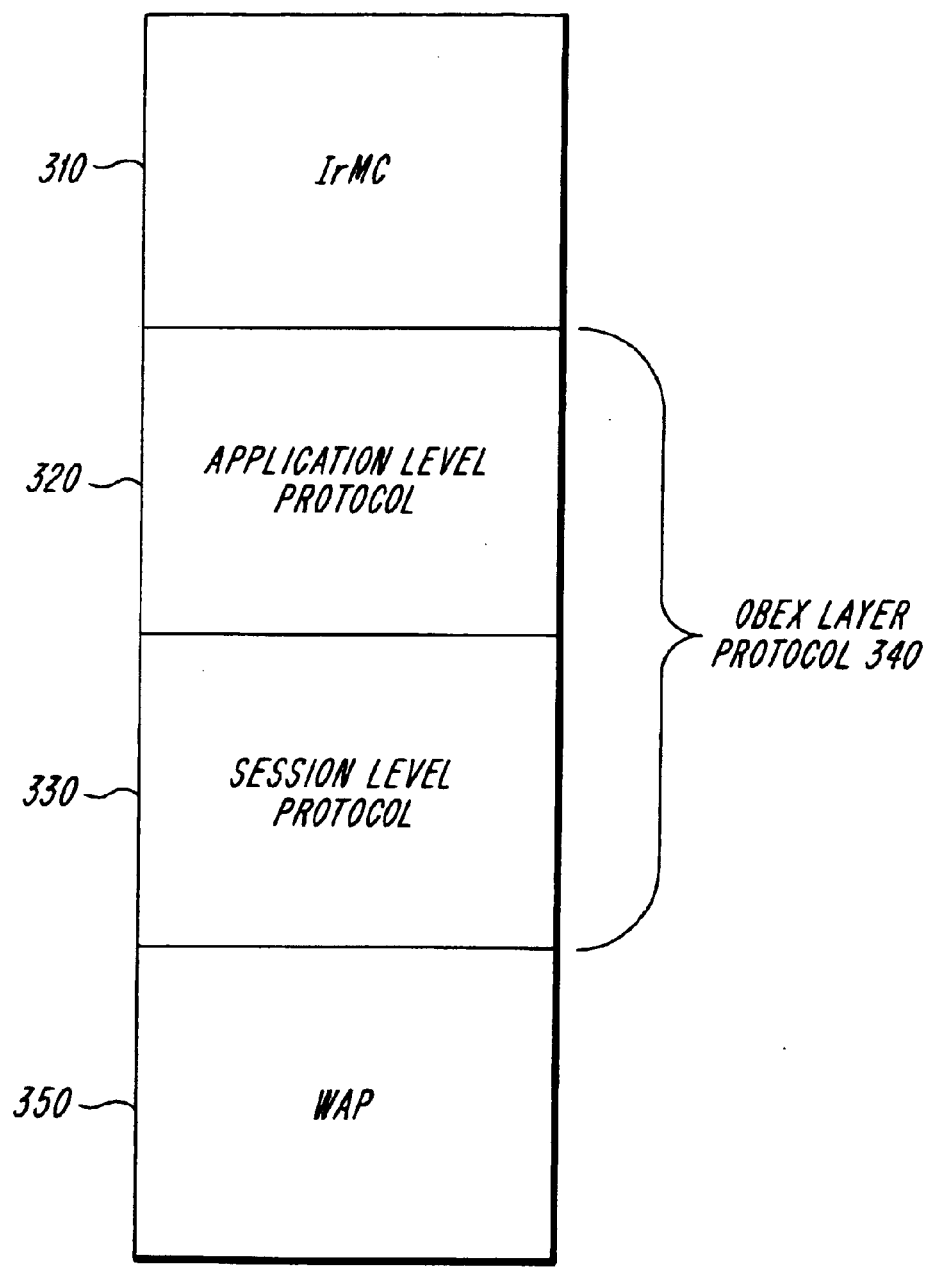
FIG. 3 depicts an exemplary embodiment of a protocol stack for tunneling of OBEX and IrMC data over WAP in accordance with the invention.

FIG. 3 illustrates an exemplary protocol stack for tunneling OBEX and IrMC data over WAP. Tunneling refers to placing a protocol from a higher layer into a lower layer protocol so that the higher layer protocol can traverse a network which operates using the lower layer protocol. At the top of the protocol stack is the IrMC layer 310. Below the IrMC layer 310 is the application level protocol layer 320 and below that is the session level protocol layer 330. The application level protocol layer 320 and the session level protocol layer 330 together constitute the OBEX protocol layer 340. At the bottom of the protocol stack is the WAP layer 350. Accordingly, the connection oriented data in the IrMC layer 310 and in the OBEX layer 340 are placed in connectionless data packets at the WAP layer 350 for transmission over the air interface between the mobile device and the server. By embedding the connection oriented IrMC and OBEX data in a connectionless protocol allows the use of IrMC and OBEX for the synchronization process over a connectionless protocol such as WAP.

As discussed above, conventional connectionless protocols require the client, such as a mobile device, to control the session which would require more memory and processing power to be placed in the mobile devices. According to exemplary embodiments of the present invention, the mobile device can initiate the session with the server, and the server controls the session.

Figure 4:
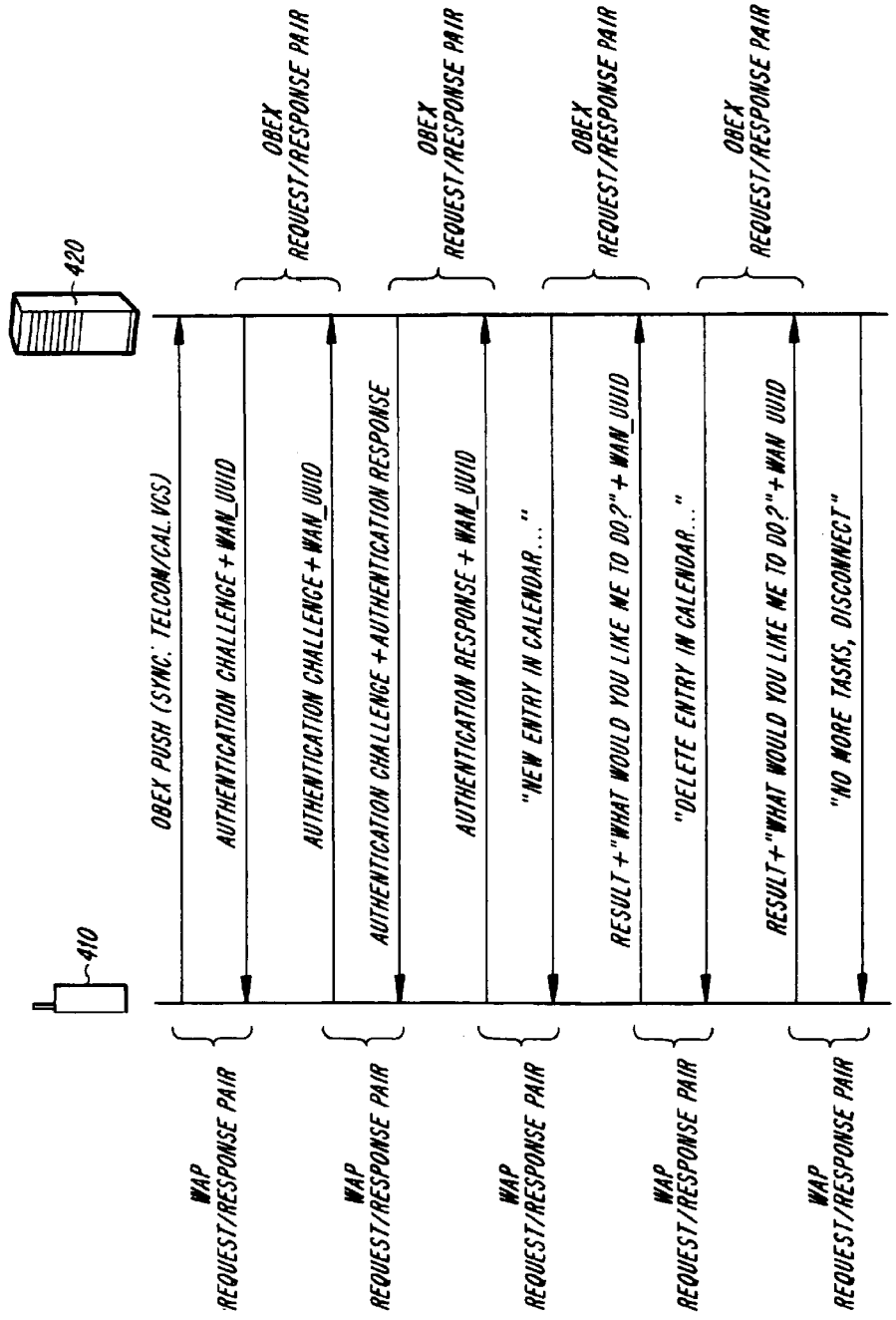
FIG. 4 depicts exemplary signaling between a mobile device and a server for synchronization of data in accordance with the invention.

FIG. 4 illustrates exemplary signaling between a mobile device 410 and a server 420 where the server 420 controls the session with the mobile device 410. The mobile device 410 initiates the session by sending an OBEX PUSH command to the server 420. The OBEX PUSH command contains information about what application is to be run during the synchronization, e.g., calender synchronization. The server 420 responds with an OBEX Authentication challenge and a Wide Area Network Synchronization Universal Unique Identifier (WAN_UUID) header containing the assigned session ID. The session ID is generated by the server 420 and is, in the exemplary embodiment, a 128-bit globally unique identifier (GUID). The mobile device 410 responds with an OBEX Authentication Challenge, including the user name in the User Id header and a WAN_UUID header containing the assigned session ID. The server 420 sends an OBEX Authentication challenge and an OBEX Authentication Response to the mobile device 410. The OBEX Authentication response contains information which is responsive to the OBEX Authentication challenge sent by the mobile device 410. The mobile device 410 then sends an OBEX Authentication Response and a WAN_UUID header containing the assigned session ID to server 420.

After the mobile device 410 and server 420 have authenticated each other the server initiates the synchronization by sending a task to the mobile device 410. For example, the server sends a "New entry in calendar" instruction, which instructs the mobile device 410 to place a new entry in a calendar application stored in the mobile device 410. The mobile device 410 responds with a result of the placing the new entry in the calendar, a "What would you like me to do?" message and a WAN_UUID header containing the assigned session ID. The server 420 next sends a "Delete entry in calendar" message to the mobile device 410. The mobile device 410 deletes the entry in the calendar requested by the server 420. The mobile device then sends a message containing the result, a "What would you like me to do?" message and a WAN_UUID header containing the assigned session ID to the server 420. The server 420 determines that there are no more actions to be performed in the synchronization process. Accordingly, the server 420 ends the session with the mobile device 410 by sending a "No more tasks, Disconnect" message.

As illustrated in FIG. 4, the present invention maintains the conventional WAP Request/Response pair. Similarly, the conventional OBEX Request/Response pair is maintained because the server 420, which did not initiate the session, is controlling the synchronization process. One skilled in the art will recognize that the types of commands sent from the server 420 to the mobile device 410 in response to the "What do you want me to do?" messages are merely exemplary and any commands which are used in the synchronization process can be substituted, such as adding or deleting contact entries, adding or deleting task, and the like. Further, one skilled in the art will recognize that since the mobile device has a one-to-one relationship with the server, the server only has to pass the session ID during the initiation sequence. However, since the server has a one-to-many relationship with the mobile devices, the mobile devices need to send a session ID with every request/response sent to the server.

According to exemplary embodiments of the present invention, the communications between the mobile device and the server are performed in the WAP layer using the POST method. A "method" is the type of client request as defined by HTTP/1.1 which is typically used by a client in Wireless Session Protocol (WSP) to invoke services on the server. In addition to the POST method, HTTP and WSP define the GET method for retrieving information stored on a server. Because there is a size limit for sending data in the URL using the GET method, the present invention uses the POST method for communications between the mobile device and the server. In addition, using the POST method avoids problems that the GET method has with special characters, e.g., blank spaces and ASCII control codes.

In every message sent from the mobile device to the server except for the initial connect request, the message will contain the session ID (sid) and OBEX header (obex) parameters. The initial connect request from the mobile device to the server will not contain the sid because this is assigned by the server, and is therefore unknown to the mobile device at the time of the initial connect request. Table I below summarizes an exemplary embodiment of the sid and obex parameters.

TABLE I

| Name | Size | Description |
| --- | --- | --- |
| sid | 16 bytes | This is the Global Unique Identifier (GUID) assigned by the server. The GUID should be coded as an array of 16 bytes, each byte representing a byte in the GUID (i.e., the array contains 16 bytes of data even if not all bytes are necessary to represent the GUID). The first byte in the array is the most significant bit of the GUID. |
| obex | Variable | This parameter contains the obex headers sent from the client to the server. The format is purely binary. |

Figure 5:
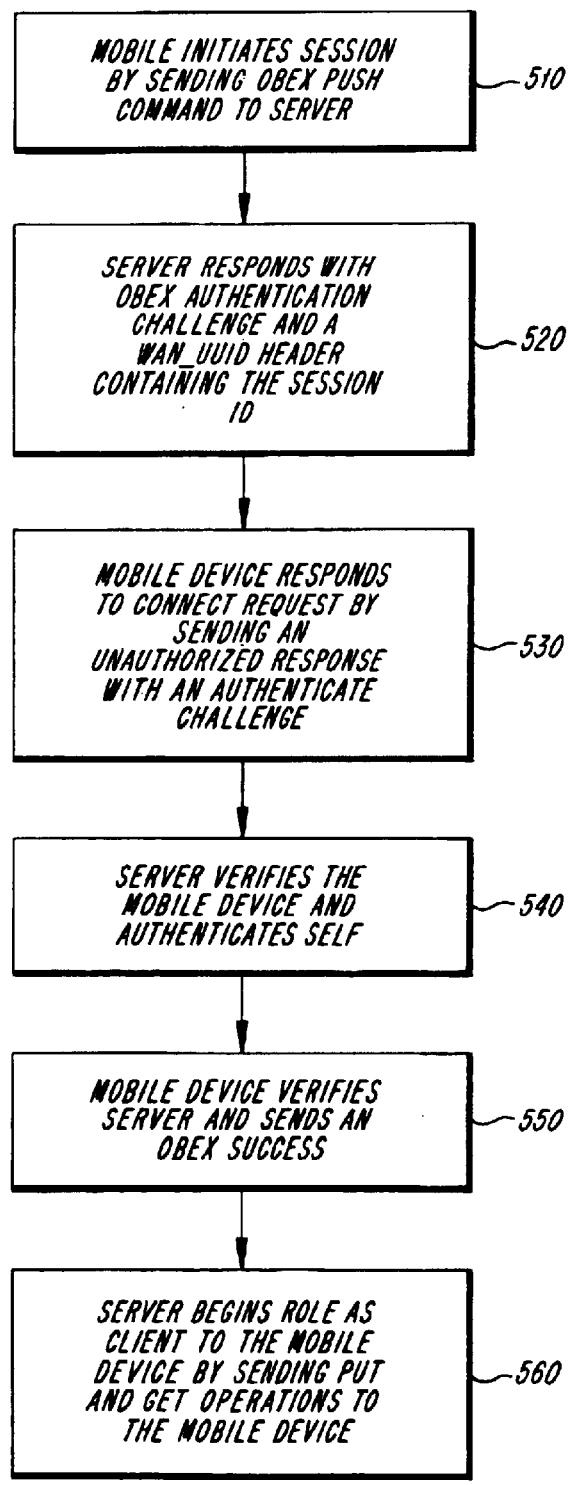
FIG. 5 depicts an exemplary method for establishing a session between a mobile device and server in accordance with the invention.

FIG. 5 illustrates a method for establishing a session between the mobile device and the server according to exemplary embodiments of the present invention. Prior to the initiation of the synchronization process, the mobile device and server establish a password for the particular mobile device, for example, by registering the mobile device with the server on a web-page. Once the password has been established, the password itself is never sent over the Internet. Instead, the password is used to generate the message digests during the authentication process described in FIG. 5.

The mobile device initiates the session by sending an OBEX Push command to the server (step 510). The server responds by sending an OBEX Authentication challenge and a WAN_UUID header containing the session ID (step 520). The mobile device responds to the connect request by sending an unauthorized response with an authenticate challenge to the server (step 530). The server verifies the mobile device and sends a message to the mobile device to authenticate itself with the mobile device (step 540). The mobile device verifies the server and responds with an OBEX success message (step 550). Now that the mobile device and server have verified each other's identity, the server begins its role as a client to the mobile device by sending OBEX PUT and GET commands to the mobile device (step 560).

According to exemplary embodiments of the present invention the authentication process described above, which is a hashing algorithm, is performed in accordance with the Message Digest 5 (MD5) algorithm. One skilled in the art will recognize that the MD5 algorithm is a hashing algorithm that produces a 16 byte digest from an arbitrary amount of data. The 16 byte digest can be used to create a check sum that is virtually unique for the original data, i.e., the digest can be considered as a virtual watermark for the data. Further, one skilled in the art will recognize that to perform the above described authentication procedure the mobile device must have access to the user name and password. The mobile device can obtain the user name and password either from memory or from user interaction.

Figure 6:
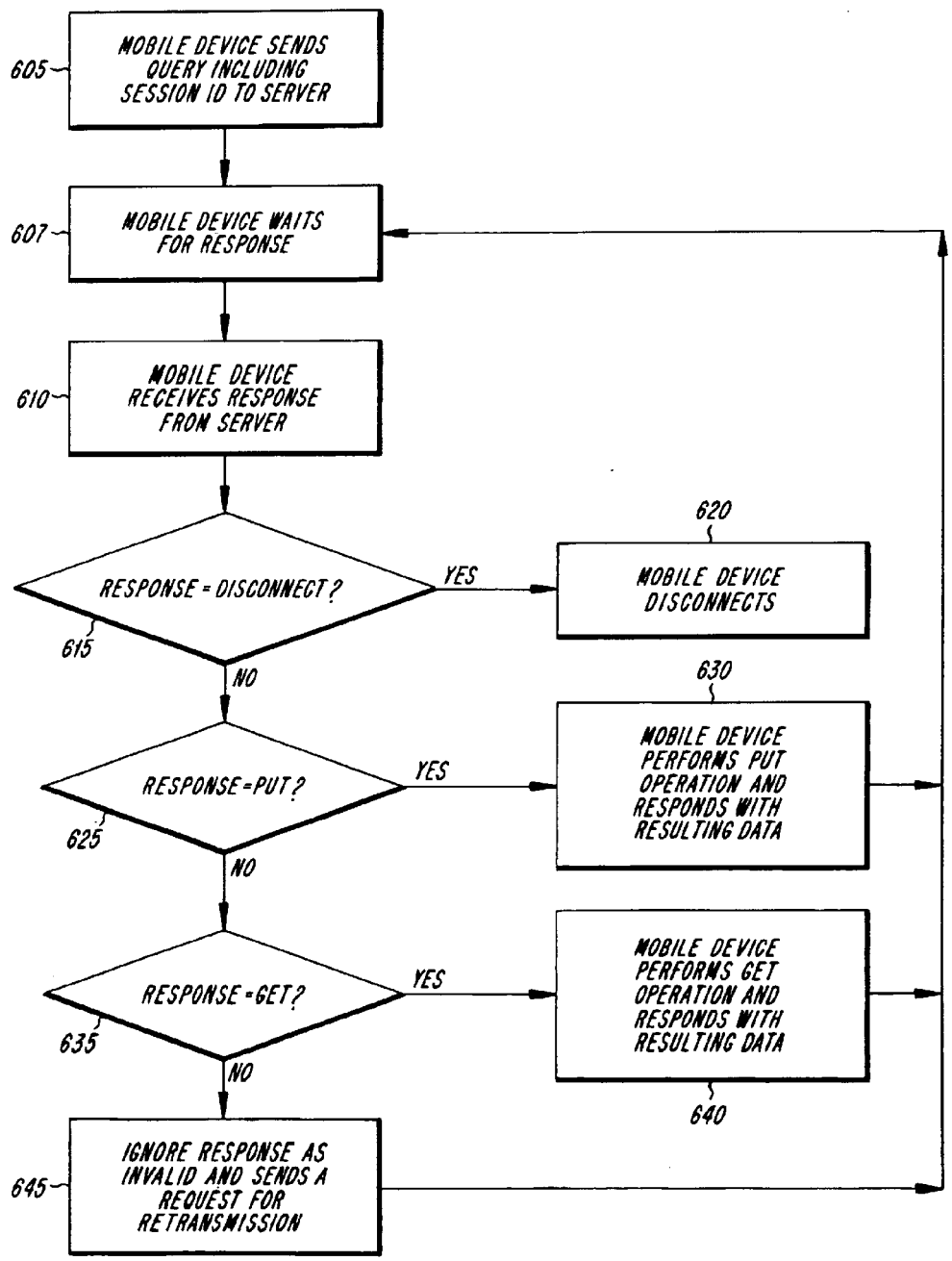
FIG. 6 illustrates an exemplary method for synchronizing data between a mobile device and server in accordance with the invention.

FIG. 6 illustrates an exemplary method for synchronizing data between a server and a mobile device after a session has been established. In step 605 the mobile device sends a query including the session ID to the server. This query is the same "What would you like me to do?" query described above with respect to FIG. 4. In step 607 the mobile device waits for the response from the server. In step 610 the mobile device receives a response from the server. The mobile device analyzes the response from the server in accordance with decision steps 615, 625 and 635.

In step 615 the mobile device determines whether the response contains an OBEX disconnect command which indicates that the server desires to terminate the session. The server will send the disconnect command when there are no more functions to be performed by the mobile device in the synchronization process. If the response contains an OBEX disconnect command ("Yes" path out of decision step 615) then the mobile device disconnects and sends no more request messages to the server (step 620). Although FIG. 6 illustrates the server as controlling the disconnection process, the mobile device could terminate the session if desired. For the mobile device to terminate the session, the mobile device would send a message containing the session ID and an OBEX disconnect command to the server in response to an OBEX GET or PUT command sent from the server to the mobile device. In response to the mobile device's disconnect message, the server would destroy the session and respond with an empty response. The empty response indicates to the mobile device that the server has terminated the session.

If the response from the server does not contain an OBEX disconnect command ("No" path out of decision step 615) the mobile device determines whether the response contains an OBEX PUT command (decision step 625). Conventionally, an OBEX PUT command is used for sending an object from the client to the server. In accordance with the present invention, the OBEX PUT command is used to send a data object from the server to the mobile device, the mobile device being a client in this scenario. In accordance with exemplary embodiments of the present invention, the data object sent using the OBEX PUT command will be data to be added to the application running on the mobile device, for example, contacts and calendar entries being added to the mobile device or changes to contact and calendar entries already present in the mobile device. If the response from the server contains an OBEX PUT command ("Yes" path out of decision step 625) the mobile device performs the OBEX PUT operation and responds with the resulting data from the PUT operation in a query message. The resulting data which is sent in response to a PUT command is a confirmation that the PUT operation has been performed by the mobile device. The mobile device then waits to receive the next response from the server (step 607).

If the response from the server does not contain an OBEX PUT command ("No" path out of decision step 625) the mobile device determines whether the response contains an OBEX GET command (decision step 635). Conventionally, an OBEX GET command is used for requesting that the server return an object to the client. In accordance with the present invention, the OBEX GET command is used to request that the mobile device return a data object to the server, the mobile device being a client in this scenario. In accordance with exemplary embodiments of the present invention, the OBEX GET command will be used by the server to retrieve items added to the application running on the mobile device which are not present in the application running on the server, for example, contacts and calendar items added to the mobile device or changes to existing contacts and calendar entries. Accordingly, if the response contains an OBEX GET command ("YES" path out of decision step 635) the mobile device performs the GET operation and sends the result to the server in a query message (step 640). The mobile device then waits to receive the next response from the server (step 607).

If the response from the server does not contain an OBEX GET command ("No" path out of decision step 635) then the mobile device ignores the message and sends a request for retransmission in a query message sent to the server (step 645). Since exemplary embodiments of the present invention use only OBEX disconnect, OBEX PUT and OBEX GET commands, if the response from the server does not contain one of these commands the mobile device does not recognize the response as valid. Of course, one skilled in the art will recognize that if more commands are implemented in the inventive system and method, these commands will be added as decision steps between decision step 635 and step 645. Further, one skilled in the art will recognize that the order in which the decision steps of FIG. 6 are executed is not important and that these decision steps have been illustrated as being placed in this order merely for ease of explanation.

The synchronization of data in the method described in connection with FIG. 6 is controlled in accordance with the IrMC protocol. One skilled in the art will recognize that other synchronization protocols which are compatible with OBEX can be substituted for the IrMC protocol.

It will be recognized that since the information being synchronized may be confidential it is desirable to provide a secure connection for exchanging the information. The authentication process described with respect to FIG. 5 only guarantees that the mobile device and the server can rely on the validity each other's identity during the session. The connection that is established is not necessarily secure and could be tapped to access the information being exchanged. It is therefore, desirable to encrypt all data that is sent between the mobile device and the server. Currently, WAP does not support secure connections such as the secured socket layer (SSL) used on the Internet.

Since the present invention uses two different transports during the synchronization process, that is, from the mobile device to the WAP gateway and from the WAP gateway to the server, it is necessary to address the security of both transports to ensure a secure connection. The transport from the mobile device to the WAP gateway is performed over the air interface which in many instances (e.g., using the GSM protocols) is fairly well encrypted. However, the transport from the WAP gateway to the server is typically not protected in any way. This transport can be protected by allowing the gateway to use standard secure sockets layer (SSL) to the server.

The description has focused on the particular communications that take place between a mobile device and a non-mobile device. However, it will be readily apparent to those having ordinary skill in the art that in the preferred embodiments, these communications are mechanized. Such mechanized functions may be embodied in any of a variety of forms, including but not limited to hard-wired circuits, or a processor executing a suitable set of program instructions stored on a computer readable storage medium such as a random access memory (RAM), read only memory (ROM), magnetic storage medium (such as magnetic tape, disk or diskette) or optical storage medium (such as compact disk (CD) ROM). The invention may be embodied in any one or combination of these forms, including but not limited to a computer readable storage medium having the suitable set or program instructions stored thereon. As used herein, the term "logic" shall be used to refer to any and all such forms of embodiment, or portions of such forms of embodiment.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of coordinating a mobile application running in a mobile device with a non-mobile application running in a non-mobile device, the method comprising:

receiving an initial communication from the mobile device by the non-mobile device;

in response to receipt of the initial communication, generating a session identifier;

forming a first connection-oriented protocol frame that includes an initial response and the session identifier;

embedding the first connection-oriented protocol frame in a first connectionless protocol frame;

sending the first connectionless protocol frame to the mobile device, in the mobile device, forming a second connection-oriented protocol frame that includes an invitation to provide service and the session identifier;

embedding the second connection-oriented protocol frame in a second connectionless protocol frame;

sending the second connectionless protocol frame to the non-mobile device;

in the non-mobile device receiving the invitation to provide service and the session identifier and in response thereto forming a third connection-oriented protocol frame that includes a request for service and the session identifier;

embedding the third connection-oriented protocol frame in a third connectionless protocol frame;

sending the third connectionless protocol frame to the mobile device;

in the mobile device, forming a fourth connection-oriented protocol frame that includes a result, a second invitation to provide service and the session identifier;

embedding the fourth connection-oriented protocol frame in a fourth connectionless protocol frame;

sending the fourth connectionless protocol frame to the non-mobile device;

in the non-mobile device, receiving the result, the second invitation to provide service and the session identifier and in response thereto forming a fifth connection-oriented protocol frame that includes a disconnect command and the session identifier;

embedding the fifth connection-oriented protocol frame in a fifth connectionless protocol frame; and sending the fifth connectionless protocol fine to the mobile device.

2. A method of coordinating a mobile application running in a mobile device with a non-mobile application running in a non-mobile device, the method comprising:

in the mobile device, forming a first connection-oriented protocol frame that includes an invitation to provide service and a session identifier;

embedding the first connection-oriented frame in a first connectionless protocol frame;

sending the first connectionless protocol frame to the non-mobile device;

in the non-mobile device, receiving the invitation to provide service and the session identifier and in response thereto forming a second connection-oriented protocol frame that includes a request for service and the session identifier;

embedding the second connection-oriented protocol frame in a second connectionless protocol frame;

sending the second connectionless protocol frame to the mobile device;

in the mobile device, forming a third connection-oriented protocol frame that includes a result, a second invitation to provide service and the session identifier;

embedding the third connection-oriented protocol frame in a third connectionless protocol frame;

sending the third connectionless protocol frame to the non-mobile device;

in the non-mobile device, receiving the result, the second invitation to provide service and the session identifier and in response thereto forming a fourth connection-oriented protocol frame that includes a disconnect command and the session identifier;

embedding the fourth connection-oriented protocol frame in a fourth connectionless protocol frame; and sending the fourth connectionless protocol frame to the mobile device.

3. A system for coordinating a mobile application running in a mobile device with a non-mobile application running in a non-mobile device, the system comprising:

logic configured to receive an initial communication from the mobile device by the non-mobile device;

in the non-mobile device, logic configured to venerate a session identifier in response to receipt of the initial communication;

logic configured to form a first connection-oriented protocol frame that includes an initial response and the session identifier;

logic configured to embed the first connection-oriented protocol frame in a first connectionless protocol frame;

logic configured to send the first connectionless protocol frame to the mobile device;

in the mobile device logic configured to form a second connection-oriented protocol frame that includes an invitation to provide service and the session identifier;

logic configured to embed the second connection-oriented frame in a second connectionless protocol frame;

logic configured to send the second connectionless protocol frame to the non-mobile device;

in the non-mobile device, logic configured to receive the invitation to provide service and the session identifier and in response thereto, to form a third connection-oriented protocol frame that includes a request for service and the session identifier;

logic configured to embed the third connection-oriented protocol frame in a third connectionless Protocol frame;

logic configured to send the third connectionless protocol frame to the mobile device;

in the mobile device, logic configured to form a fourth connection-oriented protocol frame that includes a result, a second invitation to provide service and the session identifier;

logic configured to embed the fourth connection-oriented protocol frame in a fourth connectionless protocol frame;

logic configured to send the fourth connectionless protocol frame to the non-mobile device;

in the non-mobile device, logic configured to receive the result, the second invitation to provide service and the session identifier and in response thereto, to form a fifth connection-oriented protocol frame that includes a disconnect command and the session identifier;

logic configured to embed the fifth connection-oriented protocol frame in a fifth connectionless protocol frame; and logic configured to send the fifth connectionless protocol frame to the mobile device.

4. A system for coordinating a mobile application running in a mobile device with a non-mobile application running in a non-mobile device, the system comprising:

in the mobile device, logic configured to form a first connection-oriented protocol frame that includes an invitation to provide service and a session identifier;

logic configured to embed the first connection-oriented protocol frame in a first connectionless protocol frame;

logic configured to send the first connectionless protocol frame to the non-mobile device;

in the non-mobile device, logic configured to receive the invitation to provide service and the session identifier and in response thereto, to form a second connection-oriented protocol frame that includes a request for service and the session identifier;

logic configured to embed the second connection-oriented protocol frame in a second connectionless protocol frame;

logic configured to send the second connectionless protocol frame to the mobile device;

in the mobile device, logic configured to form a third connection-oriented protocol frame that includes a result, a second invitation to provide service and the session identifier;

logic configured to embed the third connection-oriented protocol frame in a third connectionless protocol frame;

logic configured to send the third connectionless protocol frame to the non-mobile device;

in the non-mobile device, logic configured to receive the result, the second invitation to provide service and the session identifier and in response thereto, to form a fourth connection-oriented protocol frame that includes a disconnect command and the session identifier;

logic configured to embed the fourth connection-oriented protocol frame in a fourth connectionless protocol frame; and logic configured to send the fourth connectionless protocol frame to the mobile device.

5. A method of coordinating a mobile application running in a mobile device with a non-mobile application running in a non-mobile device, the method comprising:

initiating, by the mobile device, communication with a non-mobile device;

sending, by the non-mobile device, a first connectionless protocol frame having an embedded first connection-oriented protocol frame to the mobile device;

sending, by the mobile device, a second connectionless protocol frame having an embedded second connection-oriented protocol frame to the non-mobile device that includes an invitation to provide service;

sending, by the non-mobile device, a third connectionless protocol frame having an embedded third connection-oriented protocol frame to the mobile device that includes a request for service;

sending, by the mobile device, a fourth connectionless protocol frame having an embedded fourth connection-oriented protocol frame to the non-mobile device that includes a result and a second invitation to provide service; and sending, by the non-mobile device, a fifth connectionless protocol frame having an embedded fifth connection-oriented protocol frame to the mobile device that includes a disconnect command.

* * * * *

UNITED STATES PATENT AND TRADEMARK OFFICE
CERTIFICATE OF CORRECTION

PATENT NO. : 6,882,659 B1
DATED : April 19, 2005
INVENTOR(S) : Lars Novak, Björn Ekberg and Andreas Jönsson It is certified that error appears in the above-identified patent and that said Letters Patent is hereby corrected as shown below:

Column 9,
Line 22, change "device," (first occurrence) to -- device; --.
Line 29, change "device" to -- device, --.
Line 53, change "fine" to -- frame --.

Column 10,
Line 30, change "venerate" to -- generate --.
Line 41, change "device" to -- device, --.
Line 54, change "Protocol" to -- protocol --.

Signed and Sealed this

Thirtieth Day of August, 2005

JON W. DUDAS
*Director of the United States Patent and Trademark Office*